Figure 1:
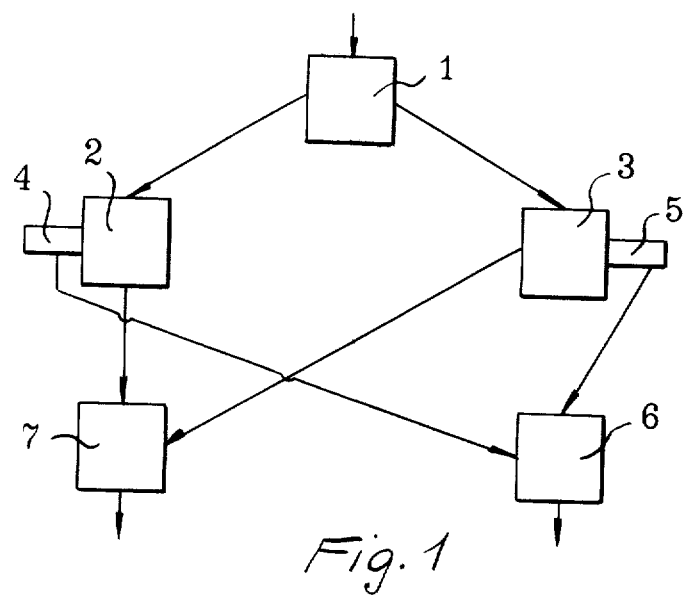

United States Patent
Acobas

[11] 4,000,031
[45] Dec. 28, 1976

[54] METHOD AND APPARATUS FOR RECOVERY OF PLASTICS AND NON-PLASTICS FROM PLASTIC-COATED WASTE MATERIAL

[76] Inventor: Ruggero Levi Detto Acobas, Via Washington 88, Milan, Italy

[22] Filed: Jan. 18, 1973

[21] Appl. No.: 324,741

[30] Foreign Application Priority Data

Feb. 4, 1972 Italy .............................. 20222/72

[52] U.S. Cl. .............................. 162/4; 162/55; 162/191; 209/3; 209/173; 241/14; 241/20; 241/21; 241/28

[51] Int. Cl.² .............................. D21C 5/02

[58] Field of Search ........... 162/4, 5, 55, 189, 191; 209/492, 13, 17, 173, 452, 293, 297, 3; 241/14, 21, 20, 28

[56] References Cited
UNITED STATES PATENTS

| | | | |
|---|---|---|---|
| 483,030 | 9/1892 | Volstorf | 209/297 |
| 3,408,255 | 10/1968 | Tatum | 162/5 |
| 3,574,050 | 4/1971 | Rice | 162/5 |
| 3,597,308 | 8/1971 | Brooks | 162/55 X |
| 3,615,014 | 10/1971 | Hruby | 162/4 |
| 3,736,223 | 5/1973 | Marsh | 162/189 X |

*Primary Examiner*—S. Leon Bashore
*Assistant Examiner*—William F. Smith
*Attorney, Agent, or Firm*—Steinberg and Blake

[57] ABSTRACT

Process and apparatus for the recovery of both cellulosic fibers and plastic material from plastic-coated papers and boards.

This material is wet-pulped in water suspension, and the suspension is then discharged into dilution tanks for floating most of the plastic material at the upper region of the suspension, wherefrom the plastic material is mechanically separated by wire-mesh conveyors, and washed in a rotating screen.

The fibrous suspension is screened in a rotating screen to eliminate the residual plastic material.

12 Claims, 6 Drawing Figures

METHOD AND APPARATUS FOR RECOVERY OF PLASTICS AND NON-PLASTICS FROM PLASTIC-COATED WASTE MATERIAL

BACKGROUND OF THE INVENTION

The invention relates to a new process and apparatus for the recovery of cellulose fibres or other non-plastic material and plastics from plastic-coated fibrous cellulose materials, plastic-coated metal foils, or the like.

The increased use of plastic-coated papers, metal foils, and/or boards constitutes a large source of waste, from which plastic and a high quality cellulosic material, metal foil, or the like can be recovered.

This waste material cannot easily be recovered by conventional wet-pulping methods. Furthermore, the plastic material, which constitutes a quite large and the most expensive portion of the waste material, must be recuperated free of fibres to enable its reuse. This is a very important for economic reasons, since otherwise the problem of disposal of these material will become quite serious.

In the term "plastic material", I include the polyolephinic resins, such as polyethylene, the polyvinyl chloride resins, the polyester resin, the plastic-aluminium foil laminates and other films which can be laminated or extruded on papers and boards.

The known methods for the recovery of such plastic-treated cellulosic materials are mainly based either on the dissolution of the plastic materials by chemical solvents, or on the mechanical separation of the cellulosic fibres from plastics, in water suspension. In those methods, based on the solvent extraction, the chemical solvent only removes the plastics, while the papers and boards remain unaltered and must be further wet-pulped to be transformed in fibers.

The solvent-extraction processes have considerable drawbacks: they are two-stage processes and the high chemical solvent losses have an important economic influence on the final cost of the recovered fibers.

Processes based on the mechanical separation of the cellulosic portion from the plastic-coated cellulosic materials are described in the U.S. Pat. No. 3,339,851 and in the corresponding British Patent No. 1,020,003 assigned to the Black Clawson Co., and in the French Patent No. 1,407,574 assigned to the Amberley Corp.

U.S. Pat. No. 3,339,851 only claims a wet-pulping apparatus. In the description of the above mentioned patent and in the British Patent No. 1,020,003 claims, a method for treating plastic-coated waste paper materials is presented.

The waste material is pulped in a water suspension, in a special tub, which is claimed in both patents, in order to obtain the separation of the fibrous material from the plastics; water is added continuously in the tub, loading the tub with additional waste material, while continuously removing liquid and fibrous material through a perforated screen situated on the bottom of the tub, and removing the plastics through a junk-remover.

This method can also be performed as a batch operation (this is the method which is used in actual practice and which is described in the Black Clawson bulletins "A guide to Waste Paper Utilisation;" by W. A. Banks, and in the "Polypulp and Polisolv Bulletin").

In that case, after pulping for sufficient time, the tub is emptied, again filled with water and re-emptied several times.

The plastics left in the tub is removed by any suitable means, for ex. by hand, or fork, or by an apparatus such as is shown in British Patent No. 713,501.

The main drawback of the process described in the first two above-mentioned patents is the impossibility to realise, in practice, continuous operation, as can be seen in all the industrial plants based on the Black-Clawson patents. It is in fact impossible to remove continuously the plastic material from the tub in which the separation of the cellulosic fibre material from the plastics has been effected, because a certain pulping time is necessary to achieve the mechanical separation between the plastics and the fibrous material. If the plastics is removed continuously, some of the added waste paper material would be removed as plastic-coated paper.

The main drawbacks of batch-operation on the basis of the Black-Clawson method are: loss of time in refilling the tub with water several times, in order to remove the major portion of the fibres through the bottom screen; a large capacity tub (approximately 36 cubic meters) is required; the plastics in the tub is contaminated by a large portion of fibres; the plastic material, when it exceeds 20% of the fibres in the water suspension, tends to block the screen perforations.

Furthermore, the rotor, claimed in the above mentioned two patents, has the tendency to reduce the plastic to small fragments which contaminate the cellulose so that fine and expensive cleaning and screening are necessary.

In French Patent No. 1,407,574 is described quite a similar batch-operation method for the recovery of cellulosic fibres from plastic-coated cellulosic material. In this case also, the separation of the cellulosic fibres from plastics is performed in the pulping apparatus, by adding water in order to maintain a certain level, while the liquid and fibres are removed through a perforated screen situated on the bottom of the pulping apparatus. Fine cleaning is necessary to separate the small plastic fragments from the fibres. The plastics left in the pulping apparatus is removed by a non-described method.

This method has all the drawbacks of the Black Clawson method, as above described.

SUMMARY OF THE INVENTION

It is a main object of the present invention to provide a continuous wet-pulping process, and apparatus, for such a process, for the recovery of plastic and cellulosic fibres from cellulosic plastic-coated materials.

It is another object of the present invention to provide a continuous process, and apparatus for such a process, for the recovery of plastics, free of fibres, for reuse.

It is a further object of the present invention to provide a process for the recovery of both plastics and fibres from plastic-coated cellulosic materials, at half the cost of already known processes. These and other objects can be obtained by a process comprising: forming an aqueous suspension by the wet-pulping of said plastic-coated cellulosic materials to separate plastics from the cellulosic fibres; discharging the said aqueous suspension into at least one tank, where it is diluted with water, during stirring; for floating the plastic material at the upper region of the diluted aqueous suspension and raising the floating plastic material up out of the tank, while the remaining fibrous water suspension is screened and stored for immediate reuse, or thickened for sale or transport in a wet-lap form.

In the process of the present invention, contrary to the known art, the separation of the cellulosic or other non-plastic portion from the plastics is not done in the pulping apparatus, but in dilution tanks where the water suspension, containing plastics and fibers, is received at the pulping consistency and diluted. This procedure allows: removal of the plastic continuously at the same time as the fibres; to obtain plastics free of fibres, for reuse; pulping of waste material containing more than 30% of plastics, a result which is not possible with the methods of the known art, because the plastic material, when in high percentage, tends to block the perforations of the screen situated at the bottom of the known pulping apparatus in which the separation of the plastics from the fibres is carried out.

Another advantage of the process of my invention is the use of a pulping apparatus having a capacity of less than half of that other pulping apparatus of the known art, for the treatment of the same quantity of plastic-coated cellulosic materials, in view of the fact that with my new process, the time required to remove the fibres through the pulper's screen as well as that time needed to wash the plastics and dump the plastics left in the pulper, is no longer lost.

Additional objects and advantages of this invention will appear from the description of the preferred embodiment of the invention and relating apparatuses illustrated in the accompanying drawings.

Figure 2:
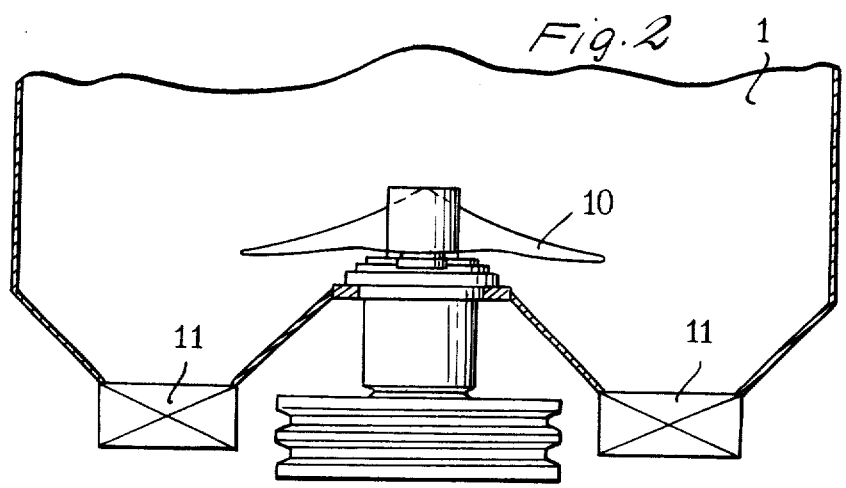
Figure 3:
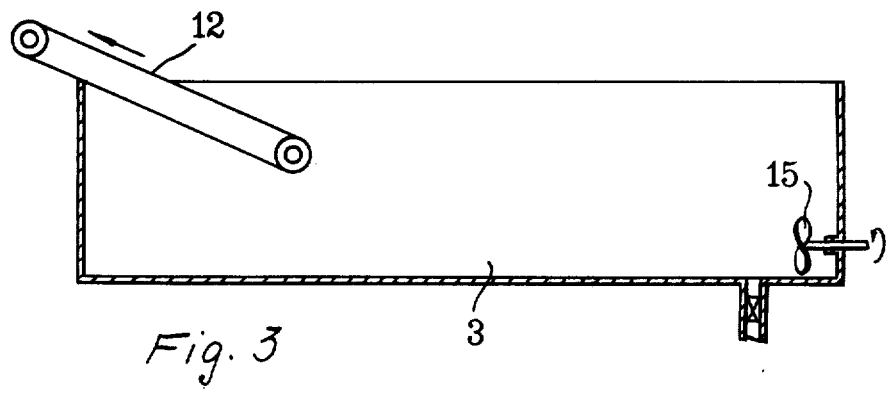
Figure 4:
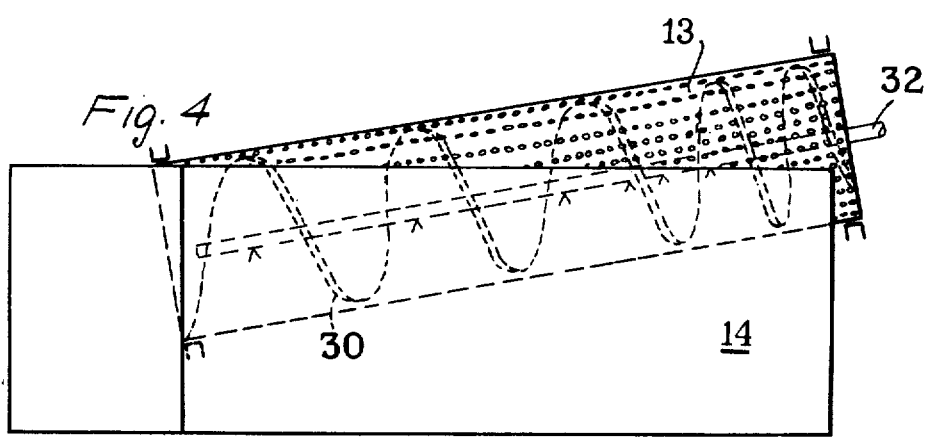

In the drawings:

FIG. 1 is a complete flow-sheet of the process. FIGS. 2,3,4 are schematic views of the components of the apparatus used for the practical realisation of the process.

Figure 5:
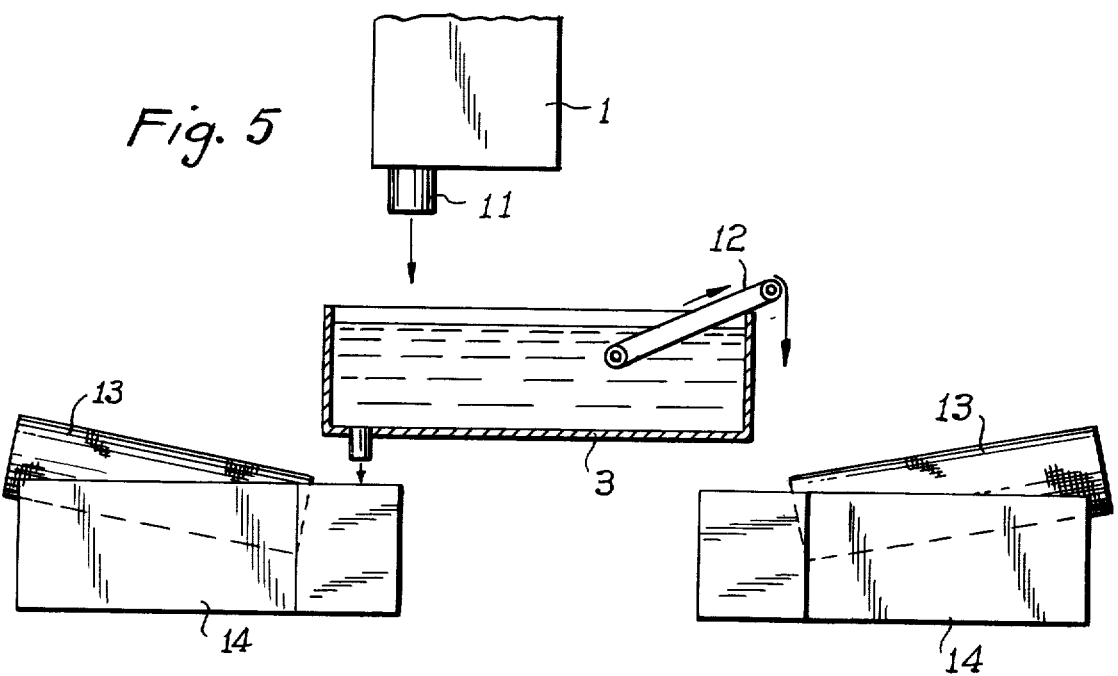
Figure 6:
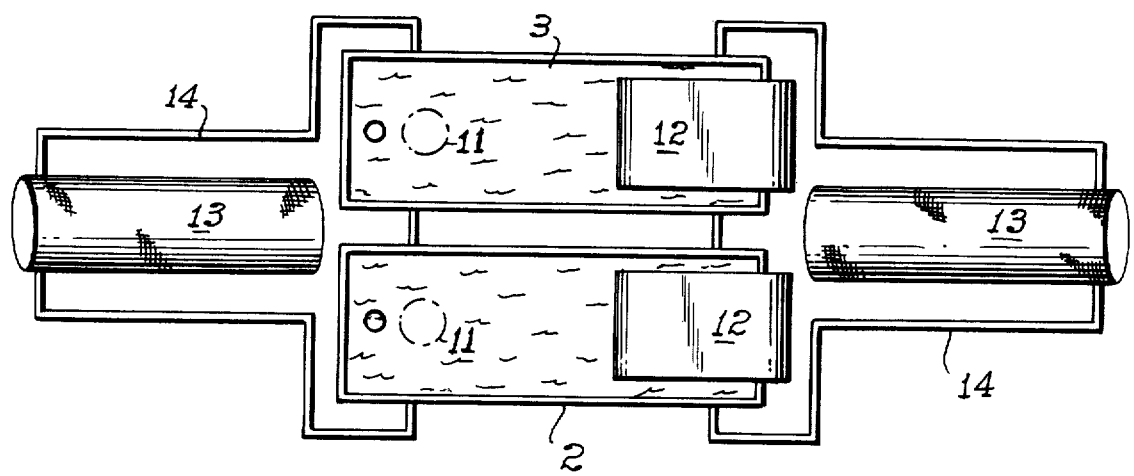

FIGS. 5 and 6 respectively show schematically in elevation and plan views the structural relationship between the components. As FIG. 1 indicates the sequence of the steps involved in the recovery of the cellulosic fibres and plastics from waste plastic-coated cellulosic materials. The waste plastic-coated cellulosic material is charged into a pulper (1) where the fibrous cellulosic material is separated from the plastics at a consistency or solid content varying between 5 to 10%, preferably at a consistency over 8%. In order to avoid the formation of an excessive amount of plastic fragments, the rotor of the pulper 1 (pulper which has a capacity of 12 cubic meters, for the processing of at least 35 metric tons of waste material per day) is formed of a propeller 10 situated at a certain distance from the bottom, of the pulper as indicated in FIG. 2.

This propeller 10 revolves at a speed of about 700 r.p.m. and is shaped in such a way as not to permit deposition of the plastic material on it. This propeller 10 makes it possible to carry out the pulping at high consistency to preserve the plastic material in large pieces. The pulping time varies from 10 to 30 minutes. Generally, pulping is carried out at room temperature, but hot water can be used as well; in that case, the time required for pulping would be further reduced. At the end of the pulping, all the material in the pulper is discharged, through valves 11 situated on the bottom of the pulper, alternatively in tanks 2 or 3 where it is diluted with water to the required consistency or solid content (based on the cellulosic fibres) varying from 0.7 to 1.3%. During the dilution time, the material is stirred by a propeller 15; in this way, the plastic material, generally of large size, is floated and tends to come to the surface. I have found that the best way to remove the floating plastics from the said diluted suspension is to rotate, in said suspension in tanks 2 or 3 a mechanical device 4 or 5, constituted by a wire-mesh conveyor 12 (FIG. 3) which is inclined with respect to a horizontal plane and removes almost all the plastic material. FIGS. 5 and 6 illustrate schematically how the suspension falls by gravity from the valves 11 into the tanks 2 and 3 with the floating plastic at the upper region of the diluted suspension in the latter tanks being raised up out of the suspension by the mechanical means 12 in the form of the wire-mesh conveyers from which the removed plastic drops into the right tank 14 shown in FIGS. 5 and 6.

The plastics extracted by the wire-mesh conveyor 12 is washed in a rotating screen 6 constituted by a perforated metal cylinder 13 with perforations having a diameter of 3–6 mm. (FIG. 4).

This screen is partially immersed in the water contained in a tank 14, is slightly inclined in respect to the axis of the tank and is equipped, internally, with a transport screw 30.

In this rotating screen 13, the plastic material is washed by water sprays 32 and is obtained free of fibres, at the end of the screen.

The water suspension of cellulosic fibres, is, in the meantime, screened through a similar rotating screen 7 to eliminate the residual non-cellulosic materials, before immediate reuse, or thickening in a wet-lap form.

Concluding, the main steps of the process are:

a. Wet-pulping of the waste plastic-coated cellulosic material in the pulper 1.

b. Alternative discharging through valves 11 (FIG. 2), in two tanks 2 and 3.

c. Mechanical separation of most of the plastics by devices 4 and 5 shown in FIG. 3.

d. Washing of the separated plastics in a rotating screen 6 shown in FIG. 4.

e. Alternative discharging of the fibrous suspension contained in tanks 2 or 3 through a rotating screen 7 similar to 6 in order to separate the residual plastics. The fibrous stock can be reused immediately or thickened for transport or sale in a wet-lap form.

What I claim is:

1. In a method for recovering from plastic-coated cellulosic waste material both the plastic and the cellulosic components thereof, the steps of wet-pulping the waste material to form a water suspension of cellulosic fibers and plastic materials, transferring the latter water suspension into a diluting tank and diluting the water suspension in the latter tank with additional water to an extent sufficient for floating most of the plastic material to the upper region of the diluted suspension in which the cellulosic material and a small part of the plastic material remain beneath the floating plastic material, mechanically raising the floating plastic material up out of the diluted suspension to leave the cellulosic and residual plastic materials therein with most of the plastic material separated therefrom by being mechanically raised out of the diluted suspension, transferring the diluted suspension to a further tank, and separating the residual plastic from the cellulosic material in the diluted suspension in the latter tank.

2. In a method as recited in claim 1 and wherein the plastic is a material selected from the group consisting of polyolephinic resins, polyvinyl chloride resins, and polyester resins.

3. In a method as recited in claim 1 and wherein the plastic material is maintained in the dilution tank in a fragmented form in which the plastic particles are larger than the cellulosic fibres.

4. In a method as recited in claim 3 and wherein the floating of the plastic material in the diluted suspension is accompanied by stirring of the latter suspension.

5. In a method as recited in claim 4 and wherein the water suspension resulting from the wet-pulping has a solid content of 5–10%, while the diluted suspension in which the plastic is floated has a solid content of 0.7–1.3%.

6. In a method as recited in claim 3 and wherein the water suspension resulting from wet-pulping has a solid content of over 8% while the diluted suspension in which the plastic is floated has a solid content of 0.7–1.3%.

7. In a method as recited in claim 1 and wherein subsequent to the removal of the plastic material from the suspension in which it floats the plastic material is screened and washed.

8. In an apparatus for recovering both plastic and non-plastic materials from plastic-coated waste material, wet-pulping means for forming a suspension from the waste material, dilution tank means situated beneath said wet-pulping means for receiving the suspension therefrom so that the latter suspension can be diluted in the dilution tank means to float the plastic material in the diluted suspension, valve means situated at the lower region of said wet-pulping means for providing a gravitational flow of the suspension from the wet-pulping means to the dilution-tank means, conveyor means in the form of a screen extending at an incline into the dilution tank means for raising the floating plastic material up out of the latter, first receiving means situated beneath said conveyor means for receiving the plastic material therefrom and for further treating the plastic material, second receiving means situated beneath said dilution tank means for receiving the diluted suspension therefrom, and means in said second receiving means for separating residual plastic material out of the diluted suspension in said second receiving means.

9. In an apparatus for recovering both plastic and non-plastic materials from plastic-coated waste material, wet-pulping means for forming a suspension from the waste material, dilution tank means situated beneath said wet-pulping means for receiving the suspension therefrom so that the latter suspension can be diluted in the dilution tank means to float the plastic material in the diluted suspension, valve means situated at the lower region of said wet-pulping means for providing a gravitational flow of the suspension from the wet-pulping means to the dilution-tank means, conveyor means in the form of a screen extending at an incline into the dilution tank means for raising the floating plastic material up out of the latter, first receiving means situated beneath said conveyor means for receiving the plastic material therefrom and for further treating the plastic material, second receiving means situated beneath said dilution tank means for receiving the diluted suspension therefrom, and means in said second receiving means for separating residual plastic material out of the diluted suspension in said second receiving means, said first receiving means including a tank into which the plastic material drops from said conveyor means and a rotary cylindrical screen which is inclined with respect to a horizontal plane and has a lower end extending into the tank of said first receiving means, said rotary cylindrical screen having in its interior a screw conveyor for conveying the plastic material upwardly along the interior of the rotary screen, said lower end of said rotary cylindrical screen being open at least to an extent sufficient to receive plastic material in said rotary cylindrical screen through said lower end thereof to be conveyed upwardly along the interior of said rotary cylindrical screen by said screw conveyor.

10. The combination of claim 9 and wherein a spray means is situated in the rotary cylindrical screen for spraying the plastic material conveyed therein.

11. The combination of claim 10 and wherein said second receiving means is identical with the first receiving means and includes said separating means which is in the form of a rotary cylindrical screen identical with that of said first receiving means for separating in the tank of said second receiving means the residual plastic from the diluted suspension in the latter tank.

12. The combination of claim 11 and wherein a pair of dilution tank means and a pair of screen conveyers respectively cooperating therewith are situated on the one hand beneath said wet-pulping means and on the other hand over the tanks of said receiving means, with said wet-pulping means having a pair of valve means for alternately delivering the suspension from said wet-pulping means to the dilution tank means.

* * * * *